(12) United States Patent
Morrison et al.

(10) Patent No.: US 10,370,470 B2
(45) Date of Patent: Aug. 6, 2019

(54) CATALYST MODIFICATION TO CONTROL POLYMER ARCHITECTURE

(71) Applicant: NOVA Chemicals (International) S.A., Fribourg (CH)

(72) Inventors: Darryl J Morrison, Calgary (CA); Stephen Salomons, Calgary (CA); Isam Jaber, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/819,189

(22) Filed: Nov. 21, 2017

(65) Prior Publication Data

US 2018/0079846 A1    Mar. 22, 2018

Related U.S. Application Data

(63) Continuation of application No. 15/217,180, filed on Jul. 22, 2016, now Pat. No. 9,862,786.

(30) Foreign Application Priority Data

Aug. 6, 2015    (CA) .................................... 2899839

(51) Int. Cl.
*C08F 4/6592* (2006.01)
*C08F 210/16* (2006.01)
*C08F 4/659* (2006.01)

(52) U.S. Cl.
CPC .......... *C08F 210/16* (2013.01); *C08F 4/6592* (2013.01); *C08F 4/65912* (2013.01); *C08F 4/65908* (2013.01); *C08F 2420/04* (2013.01)

(58) Field of Classification Search
CPC ........................ C08F 4/6592; C08F 4/65908; C08F 4/65912; C08F 210/16
See application file for complete search history.

(56) References Cited

U.S. PATENT DOCUMENTS

| 4,798,081 A | 1/1989 | Hazlitt et al. |
| 5,008,204 A | 4/1991 | Stehling |
| 6,777,509 B2 | 8/2004 | Brown et al. |
| 6,984,695 B2 | 1/2006 | Brown et al. |

OTHER PUBLICATIONS

Wild, L, Ryle, T.R., Knobelock, D.C. and Peat, I.R.; Determination of Branching Distributions in Polyethylene and Ethylene Copolymers; Journal of Polymer Science: Polymer Physics Edition, vol. 20, (1982), pp. 441-455.
ASTM D 1928-96; Standard Practice for Preparation of Compression-Molded Polyethylene Test Sheets and Test Specimens, Copyright ASTM International; approved Jul. 10, 1996, Published Sep. 1996; pp. 1-7.
ASTM D1238-13; Standard Test Method for Melt Flow Rates of Thermoplastics by Extrusion Plastometer; Copyright ASTM International; approved Aug. 1, 2013, Published Aug. 2013; pp. 1-16.

*Primary Examiner* — Caixia Lu
(74) *Attorney, Agent, or Firm* — Julie L. Heinrich (57) ABSTRACT

By controlling the ratio of catalyst components or the type of activator the homogeneity of a polymer produced using a single site catalyst may be improved.

8 Claims, 7 Drawing Sheets

CATALYST MODIFICATION TO CONTROL POLYMER ARCHITECTURE

REFERENCE TO RELATED APPLICATION

This application is a continuation of U.S. Ser. No. 15/217,180, filed Jul. 22, 2016, entitled "Catalyst Modification to Control Polymer Architecture", which is herein incorporated by reference in its entirety.

The present disclosure relates to a method to improve the homogeneity of a copolymer produced in a solution polymerization using a single site catalyst in the presence of aluminoxane and an ionic activator. In conducting a solution phase polymerization, there is a tradeoff between catalyst activity and circulation rate through the reactor. It is desirable to have a highly reactive catalyst or catalyst system. In some instances, the polymer produced may have a degree of in-homogeneity in that the polymer has up to 10 wt. % or more of a component having a molecular weight of greater than $10^{5.3}$. In further embodiments, this component may have a molecular weight greater than $10^{5.5}$. It may be desirable to reduce the amount of this component.

There are a number of copolymers produced in the presence of a single site catalyst which are "bimodal". Typically, these resins have a TREF having an inflection point at an elution temperature of about 90° C. to 93° C., typically 90° C. to 91° C. The fraction may have a weight average molecular weight ranging from about $10^{5.3}$ to $10^{5.5}$. Without wishing to be bound by theory, it is believed such copolymers comprise two homogeneous copolymer components having a different molecular weight and/or density. Provided that the fraction of a copolymer produced using a single site catalyst having an elution temperature above about 90° C. is less than about 10 wt. %, the total copolymer is relatively homogeneous. As the amount of this component in the copolymer increases, there may associated issues of processing and product homogeneity. This is particularly evident in polymers having a density up to about 0.940 g/cc. However, the processes described herein are equally applicable to higher density polymers having a density up to about 0.960 g/cc.

U.S. Pat. No. 6,984,695 teaches the solution phase polymerization of polyethylene in a solution phase in the presence of a phosphinimine catalyst and an activator. The patent teaches, at Col. 13, lines 60-65, that the monomer feeds and the position of the monomer feed ports relative to the catalyst feed port was varied to examine the effect of these variables upon the microstructure of the polymer. Although the ratio of Al/Ti varied from 205:1 to 65:1, the weight % of the "heterogenized" fraction did not appear to change significantly.

U.S. Pat. No. 6,777,509, issued Aug. 17, 2004 to Brown et al., assigned to NOVA Chemicals (International) S.A., teaches using a trialkyl aluminum compound in a catalyst system comprising a phosphinimine complex to produce olefin copolymers with broadened molecular weight distributions, Mw/Mn, of greater than 2.0. In some embodiments of the invention disclosed herein, copolymers with narrow Mw/Mn (ranging from 1.7 to 2.2) are produced using a catalyst system comprising a phosphinimine complex, a boron activator and an aluminoxane. None of the above art discusses a method for improving the homogeneity of the copolymer produced when using single site catalyst systems by varying the ratios of the catalyst components or by changing the boron activator.

In some embodiments, the present disclosure seeks to provide a simple method for improving the homogeneity of a copolymer prepared in the presence of a single site catalyst system.

In one embodiment, a method is provided to increase the homogeneity of a copolymer by reducing the amount of the component eluting at a temperature of greater than 90° C., in the temperature rising elution fractionation analysis wherein the copolymer is produced using a solution polymerization process in the presence of a catalyst system comprising:

1. transition metal catalyst of the formula:

wherein M is a transition, for example a transition metal selected from Ti, Hf and Zr; L is a monoanionic ligand selected from a cyclopentadienyl ligand, a indenyl ligand and a fluorenyl ligand which ligands are unsubstituted or up to fully substituted with one or more substituents selected from chlorine atoms, fluorine atoms and $C_{1-4}$ alkyl radicals which are unsubstituted or which may be substituted with chlorine or fluorine atoms, and a phosphinimine ligand; X is a monoanionic ligand from the group $C_{1-4}$ alkyl radicals and chlorine atom; n may be from 1 to 3, and p may be from 1 to 3, provided that the sum of n+p equals the valence state of M, and further provided that two L ligands may be bridged by a silyl radical or a $C_{1-4}$ alkyl radical;

2. a boron activator capable of ionizing the transition metal complex selected from:
   (i) compounds of the formula $[R^5]^+[B(R^7)_4]^-$ wherein B is a boron atom, $R^5$ is a cyclic $C_{5-7}$ aromatic cation or a triphenyl methyl cation and each $R^7$ is independently selected from phenyl radicals which are unsubstituted or substituted with from 3 to 5 substituents selected from a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from a hydrogen atom and a $C_{1-4}$ alkyl radical; and
   (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
   (iii) compounds of the formula $B(R^7)_3$ wherein $R^7$ is as defined above;

3. an aluminoxane of the formula $(R^4)_2AlO(R^4AlO)_mAl(R^4)_2$ wherein each $R^4$ is independently selected from $C_{1-4}$ alkyl radicals, m is from 3 to 50 and comprising keeping the temperature and mixing conditions in the reactor constant and adjusting one or more of:
   a) the ratio of components 2 and 3; and
   b) changing component 2.

In a further embodiment, in the catalyst, n is 2.

In a further embodiment, one L is a phosphinimine ligand of the formula:

wherein each $R^3$ is independently selected from a hydrogen atom; a halogen atom; $C_{1-10}$ hydrocarbyl radicals which is unsubstituted by or further substituted by a halogen atom; a $C_{1-8}$ alkoxy radical; a $C_{6-10}$ aryl or aryloxy radical; and an amido radical which is unsubstituted or substituted by up to two $C_{1-10}$ hydrocarbyl radicals.

In a further embodiment, the reaction temperature is from 110° C. to 180° C. and the pressure is from 6,000 kPa to 22,000 kPa.

In a further embodiment, the starting ratio of catalyst components aluminoxane:catalyst:ionic activator is 100:1: greater than 1.1 and is reduced to 50-100:1:0.3-1.05.

In a further embodiment, the ionic activator is selected from triphenylcarbenium tetrakis(pentafluorophenyl)borate (sometimes referred to as trityl borate) and tris(pentafluorophenyl)borane.

In a further embodiment, the aluminoxane is methyl aluminoxane.

In a further embodiment, the catalyst is cyclopentadienyl tri-tert-butyl-phosphinimine titanium dichloride.

In a further embodiment, the catalyst is alkylated within ten minutes prior to use.

NUMBERS RANGES

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the properties that the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, the amounts of the components actually used will conform to the maximum of 100 percent.

Solution Phase Polymerization

Solution processes for the (co)polymerization of ethylene are well known in the art. These processes are conducted in the presence of an inert hydrocarbon solvent, for example, a $C_{5-12}$ hydrocarbon which may be unsubstituted or substituted by a $C_{1-4}$ alkyl group, such as pentane, methyl pentane, hexane, heptane, octane, cyclohexane, methycyclohexane and hydrogenated naphtha. An example of a suitable solvent which is commercially available is "Isopar E" ($C_{8-12}$ aliphatic solvent, Exxon Chemical Co.).

The polymerization is conducted at temperatures from about 80° C. up to about 220° C., in some embodiments, from about 120° C. to 220° C., in alternate embodiments from 120° C. to 180° C. and, in further embodiments, from 160° C. to 210° C. Pressures for solution polymerization are, for example, less than about 6,000 psi (about 42,000 kilopascals or kPa), and, in some embodiments, may range from about 870 psi to 3,000 psi (about 6,000 to 22,000 kPa).

In some embodiments, two reactors are used. The polymerization temperature in the first reactor is from about 80° C. to about 180° C. (for example, from about 120° C. to 160° C.) and the second reactor is operated at a higher temperature (up to about 220° C.).

Suitable monomers for copolymerization with ethylene include $C_{4-10}$ alpha olefins. In some embodiments, the comonomers include alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. In some embodiments, the comonomer is 1-octene.

Catalyst System

The catalyst systems disclosed herein comprise a catalyst, a co-catalyst and an activator or an ionic activator.

The Catalyst

The catalyst is a transition metal catalyst of the formula:

wherein M is a transition metal, for example a transition metal selected from Ti, Hf and Zr; L is a monoanionic ligand selected from a cyclopentadienyl type ligand, as defined below, a hetero atom ligand of the formula $J(R)_{x-2}$ wherein J is selected from a nitrogen atom, a phosphorus atom, a carbon atom and a silicon atom and each R is independently a $C_{1-20}$, or, for example, $C_{1-6}$ hydrocarbyl radical which is unsubstituted or substituted by one or more halogen, or, for example, chlorine or fluorine atoms and x is the coordination number of J, and a phosphinimine ligand; X is a monoanionic ligand from the group $C_{1-4}$ alkyl radicals and chlorine atom; n may be from 1 to 3, and p may be from 1 to 3, provided that the sum of n+p equals the valence state of M, and further provided that two L ligands may be bridged by a silyl radical or a $C_{1-4}$ alkyl radical;

The term "cyclopentadienyl type ligand" refers to a 5-member carbon ring having delocalized bonding within the ring and typically being bound to the active catalyst site, for example, a group 4 metal (M) through $\eta^5$-bonds. The cyclopentadienyl ligand may be unsubstituted or up to fully substituted with one or more substituents selected from $C_{1-10}$ hydrocarbyl radicals which are unsubstituted or further substituted by one or more substituents selected from a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from hydrogen, a $C_{1-8}$ alkyl or alkoxy radical, $C_{6-10}$ aryl or aryloxy radicals; and germanyl radicals of the formula Ge—$(R)_3$ wherein R is as defined above.

In one embodiment, the cyclopentadienyl-type ligand is selected from a cyclopentadienyl radical, an indenyl radical and a fluorenyl radical which radicals are unsubstituted or up to fully substituted by one or more substituents selected from a fluorine atom, a chlorine atom; $C_{1-4}$ alkyl radicals; and a phenyl or benzyl radical which is unsubstituted or substituted by one or more fluorine atoms.

Phosphinimine ligands have formula:

wherein each $R^3$ is independently selected from a hydrogen atom; a halogen atom; hydrocarbyl radicals, for example, $C_{1-10}$, which are unsubstituted by or further substituted by one or more halogen atoms; $C_{1-8}$ alkoxy radicals; $C_{6-10}$ aryl or aryloxy radicals; amido radicals; silyl radicals of the formula:

wherein each $R^3$ is as defined above; and a germanyl radical of the formula:

wherein $R^3$ is as defined above;

In some embodiments, the phosphinimine ligands are those in which each $R^3$ is a hydrocarbyl radical, for example, a $C_{1-6}$ hydrocarbyl radical, in some embodiments a $C_{1-4}$ hydrocarbyl radical in further embodiments $R^3$ is a t-butyl ligand.

In some embodiments, n is 2 and each L is a cyclopentadienyl ligand. In such embodiments, the catalyst would be a conventional metallocene ligand. If bridged the catalyst would be a bridged metallocene. In other embodiments, one L is a cyclopentadienyl ligand and one L is a ligand of the formula J $(R)_{x-2}$ and if the ligands are bridged, the catalyst would be a constrained geometry catalyst. In other embodiments, n is 2 and one L is a cyclopentadienyl ligand and the other L is a phosphinimine ligand.

In some embodiments, the catalyst has the formula wherein M is selected from Ti, Zr and Hf; PI is a phosphinimine ligand as described above; L is a monoanionic cyclopentadienyl-type ligand as described above, X is independently selected from activatable ligands; m is 1 or 2; n is 0 or 1; p is an integer and the sum of m+n+p equals the valence state of M.

Activatable ligands X may be selected from a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. In some embodiments, X is selected from a chlorine atom, a methyl radical, an ethyl radical and a benzyl radical.

The Co-Catalyst

The term co-catalyst used herein refers to aluminoxane.

Suitable aluminoxane may be of the formula: $(R^4)_2AlO(R^4AlO)_mAl(R^4)_2$ wherein each $R^4$ is independently selected from $C_{1-20}$ hydrocarbyl radicals and m is from 0 to 50, or, for example, $R^4$ is a $C_{1-4}$ alkyl radical and m is from 5 to 30. Methylaluminoxane (or "MAO") in which each R is methyl is an aluminoxane.

Aluminoxanes are well known as co-catalysts, particularly for metallocene-type catalysts. Aluminoxanes are readily available articles of commerce.

The use of an aluminoxane co-catalyst generally requires a molar ratio of aluminum to the transition metal in the catalyst from 20:1 to 1000:1. Example ratios are from 50:1 to 250:1.

Commercially available MAO typically contains free aluminum alkyl (e.g., trimethylaluminum or "TMA") which may reduce catalyst activity and/or broaden the molecular weight distribution of the polymer. If a narrow molecular weight distribution polymer is required, it is preferred to treat commercially available MAO with an additive which is capable of reacting with the TMA. Alcohols are useful (with hindered phenols being particularly useful) for this purpose. In some embodiments, the hindered phenol is 2,6-di-tert-butyl-4-ethylphenol. If present, the hindered phenol may be used in amount up to about 0.6 moles per mole of Al. In some embodiments, the molar ratio of hindered phenol to Al may range from 0.1:1 to 0.5:1, in some embodiments, from 0.15:1 to 0.4:1, in some embodiments, from 0.3:1 to 0.4:1.

"Ionic Activators"

Used herein "ionic activators" refers to activators capable of abstracting one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center. Some example ionic activators are boron-containing ionic activators described in (i) to (iii) below:

(i) compounds of the formula $[R^5]^+[B(R^7)_4]^-$ wherein B is a boron atom, $R^5$ is an aromatic hydrocarbyl (e.g., triphenylcarbenium cation) and each $R^7$ is independently selected from phenyl radicals which are unsubstituted or substituted with from 3 to 5 substituents selected from a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula B(R⁷)₃ wherein R⁷ is as defined above.

In the above compounds, in some embodiments, $R^7$ is a pentafluorophenyl radical, and $R^5$ is a triphenylcarbenium cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include: triethylammonium tetra(phenyl)borate; tripropylammonium tetra(phenyl)borate; tri(n-butyl)ammonium tetraphenylborate; trimethylammonium tetrakis(p-tolyl)borate; trimethylammonium tetrakis(o-tolyl)borate; tributylammonium tetrakis(pentafluorophenyl)borate; tripropylammonium tetrakis(o,p-dimethylphenyl)borate; tributylammonium tetrakis(m,m-dimethylphenyl)borate; tributylammonium tetrakis(p-trifluoromethylphenyl)borate; tributylammonium tetrakis(pentafluorophenyl)borate; tri(n-butyl)ammonium tetrakis(o-tolyl)borate; N,N-dimethylanilinium tetraphenylborate; N,N-diethylanilinium tetraphenylborate; N,N-diethylanilinium tri(phenyl)(n-butyl)borate, N,N-2,4,6-tetramethylanilinium tetraphenylborate; di-(isopropyl)ammonium tetrakis(pentafluorophenyl)borate; dicyclohexylammonium tetraphenylborate, triphenylphosphonium tetraphenylborate; tri(methylphenyl)phosphonium tetraphenylborate; tri(dimethylphenyl)phosphonium tetraphenylborate; tropilium tetrakis(pentafluorophenyl)borate; triphenylcarbenium tetrakis(pentafluorophenyl)borate; benzenediazonium tetrakis(pentafluorophenyl)borate; tropilium phenyl-tris(pentafluorophenyl)borate; triphenylcarbenium phenyl-tris(pentafluorophenyl)borate; benzenediazonium phenyl-tris(pentafluorophenyl)borate; tropilium tetrakis(2,3,5,6-tetrafluorophenyl)borate; triphenylcarbenium tetrakis(2,3,5,6-tetrafluorophenyl)borate; benzenediazonium tetrakis(3,4,5-trifluorophenyl)borate; tropilium tetrakis(3,4,5-trifluorophenyl)borate; benzenediazonium tetrakis(3,4,5-trifluorophenyl)borate; tropilium tetrakis(1,2,2-trifluoroethenyl)borate; triphenylcarbenium tetrakis(1,2,2-trifluoroethenyl)borate; benzenediazonium tetrakis(1,2,2-trifluoroethenyl)borate; tropilium tetrakis(2,3,4,5-tetrafluorophenyl)borate; triphenylcarbenium tetrakis(2,3,4,5-tetrafluorophenyl)borate; and benzenediazonium tetrakis(2,3,4,5-tetrafluorophenyl)borate.

Readily commercially available ionic activators include: N,N-dimethylanilinium tetrakis(pentafluorophenyl)borate; triphenylcarbenium tetrakis(pentafluorophenyl)borate (sometimes referred to as trityl borate); and tris(pentafluorophenyl)borane.

In some embodiments, starting ratio of catalyst components aluminoxane:catalyst:ionic activator is 100:1:greater than 1.1 and is reduced to 50-100:1:0.3-1.05. When such a reduction in the components is made, the amount of polymer having a molecular weight of $10^{5.3}$ or greater is reduced while maintaining the same temperature and mixing conditions in the reactor.

In some further embodiments, the one or more of the components in the catalyst system could be changed to a different homologue. Typically, in such embodiments, the homologue would provide a higher degree of steric hindrance at the active metal site.

The polymers produced with the catalyst systems disclosed herein have a higher CDBI and a lower amount of molecular weight above $10^{5.3}$. The $CDBI_{50}$ composition distribution breadth index (CDBI). The $CDBI_{50}$ is defined as the weight percent of the polymer molecules having a comonomer content within 50 percent of the median total molar comonomer content. The $CDBI_{50}$ is determined using techniques well known in the art, particularly temperature rising elution fractionation (TREF) as described in Wild et al. Journal of Polymer Science, Pol. Phys. Ed. Vol 20, p 441 (1982) or in U.S. Pat. No. 4,798,081. The molecular weight distribution of a polymer may be determined using GPC (Gel Permeation Chromatography). In some embodiments in the polymers disclosed herein, the $CBDI_{50}$ will be increased by at least about 3%, (e.g., from about 82% to 85% or from 78% to 82%). In some instances, the $CBDI_{50}$ may be increased by up to 5%.

If Fourier transform IR is also conducted on the sample undergoing GPC, the comonomer incorporation can also be shown graphically.

The present disclosure is applicable to polymers having a density up to about 0.940 g/cc. At higher densities, the so called higher density peak (really a higher molecular weight peak) is less apparent and, in solution phase polymerization, is usually below 10 wt. %. In some embodiments, the polymers may have a density from 0.905 to 0.935 g/cc. In further embodiments, the polymer may have a density 0.915 to 0.930 g/cc. In some embodiments, the polymers also have a melt index ($I_2$) of from 1 to 10 g/10 min, in some embodiments, from 2.5 to 7.5 g/10 min. a melt flow ratio (I21/I2) of from 10 to 25 g/10 min, in some embodiments from 15 to 20 g/10 min, a molecular weight distribution (Mw/Mn) of from 1.5 to 2.5, in some embodiments, from 1.7 to 2.3.

The amount of copolymer eluting at a temperature of 90° C. or higher, for example, the amount eluting from 90° C. to 105° C., may be reduced by from 5 to 40%, in some embodiments, from 10 to 35%. Such a component may have a weight average molecular weight (Mw) from about 225,000 to about 275,000 (about $10^{5.3}$ to about $10^{5.5}$).

Additionally, the $CDBI_{50}$ of the polymer may be increased by up to about 5%, in some embodiments, up to 4.5%.

Such polymers are useful, for example, in a wide range of applications including, without limitation, film applications, both blown and cast of mono or multi-layer films, for various types of packaging; injection, rotational, and blow molding as used for example for small bottles or larger drums or containers; extrusion of fibers or profiled components; and compression molding for example in small parts.

The present invention will now be illustrated by the following examples.

In the examples, the following catalyst components were used.

The catalyst was cyclopentadienyl tri-t-butyl-phosphinimine titanium dichloride.

The co-catalyst was methylaluminoxane. It was used in conjunction with a hindered phenol (2,6-di-tert-butyl-4-ethylphenol).

The activator was either triphenylcarbenium tetrakis(pentafluorophenyl)borate or tris(pentafluorophenyl)borane.

The pilot scale reactor was operated using the following conditions: total flow to the reactor was 450 kg/hr; polymer production rate was 50 kg/hr; ethylene concentration 9.3 wt %; weight ratio of 1-octene to ethylene 0.6; hydrogen concentration in the reactor 0.5 ppm; primary feed temperature 20° C.; Diluent temperature 30.2° C.; reactor mean temperature 163-165° C.; and ethylene conversion at the reactor outlet 90%.

The products were tested for a number of properties. Density was determined according to ASTM D-1928; MI (I2) and MFR (I21/I2) were determined according to ASTM D1238; molecular weights were determined using GPC (Waters 150c with 1,2,4-trichlorobenzene as the mobile phase at 140° C.) $CBDI_{50}$ was determined using TREF. One such technique is described in Wild, et al., J. Poly. Sci., Poly. Phys. Ed., vol. 20, p. 441 (1982) and U.S. Pat. No. 5,008,204, which are incorporated herein by reference.

Stress exponent is determined by measuring the throughput of a melt indexer at two stresses (2160 g and 6480 g loading) using the procedures of the ASTM melt index test method, and the following formula:

Stress exponent=1/0.477×log(wt. of polymer extruded with 6480 g wt.)/(wt. of polymer extruded with 2160 g wt.)

Stress exponent values of less than about 1.40 indicate narrow molecular weight distribution while values above about 1.70 indicate broad molecular weight distribution.

Table 1 shows alternate catalyst system composition.

TABLE 1

| Product | Al/catalyst | Hindered phenol/Al | Trityl borate/catalyst | Borane/catalyst | Agitator RPM |
|---|---|---|---|---|---|
| Product 1A Comparative | 100 | 0.30 | 1.2 | | 1170 |
| Product 1B Comparative | 100 | 0.30 | 1.2 | | 400 |
| Product 2A | 50 | 0.15 | 0.60 | | 1170 |
| Product 2B | 50 | 0.15 | 0.60 | | 400 |
| Product 3A | 100 | 0.30 | 0.30 | | 1170 |
| Product 3B | 100 | 0.30 | 0.30 | | 400 |
| Product 4A Comparative | 100 | 0.30 | 1.3 | | 1170 |
| Product 4B Comparative | 100 | 0.30 | 1.3 | | 407 |
| Product 5A | 100 | 0.30 | 0.15 | 1.05 | 1170 |
| Product 5B | 100 | 0.30 | 0.15 | 1.05 | 400 |
| Product 6A | 100 | 0.30 | | 1.20 | 1170 |
| Product 6B | 100 | 0.30 | | 1.20 | 400 |

TABLE 2

The tests on the products produced in runs 1A, 1B, 2A, 2B, 3A and 3B.

| Product Designation | | Product 1A Comp. | Product 1B Comp. | Product 2A | Product 2B | Product 3A | Product 3B |
|---|---|---|---|---|---|---|---|
| CSTR agitator speed | rpm | 1170.0 | 400.0 | 1170.0 | 400.0 | 1170.0 | 400.0 |
| Catalyst Conditions | | | | | | | |
| Catalyst concentration in CSTR | ppm Ti | 0.29 | 0.25 | 1.15 | 0.76 | 1.26 | 0.88 |
| Al/Ti ratio | mol/mol | 100.0 | 100.0 | 50.0 | 50.0 | 100.0 | 100.0 |
| Hindered phenol/Al ratio | mol/mol | 0.30 | 0.30 | 0.15 | 0.15 | 0.30 | 0.30 |
| Trityl borate/Ti ratio | mol/mol | 1.17 | 1.17 | 0.60 | 0.60 | 0.30 | 0.30 |
| Borane/Ti ratio | mol/mol | — | — | — | — | — | — |
| Polymer Properties | | | | | | | |
| Density | g/cc | 0.9187 | 0.9186 | 0.9189 | 0.9187 | 0.9182 | 0.9185 |
| MI (I2) | g/10 min | 6.16 | 2.69 | 6.08 | 2.88 | 4.94 | 2.84 |
| S. Ex. (I5/I2) | | 1.15 | 1.23 | 1.12 | 1.16 | 1.13 | 1.17 |
| MFR (I21/I2) | | 17.4 | 19.9 | 15.8 | 17.4 | 16.2 | 17.9 |
| $M_n$ | | 30900 | 40515 | 36302 | 41218 | 30973 | 42141 |
| $M_w$ | | 57464 | 87697 | 65813 | 84608 | 65992 | 81578 |
| $M_z$ | | 87414 | 242449 | 108741 | 171581 | 109425 | 161667 |
| $M_w/M_n$ | | 1.9 | 2.2 | 1.8 | 2.1 | 2.1 | 1.9 |
| TREF 90-105° C. fraction | wt % | 3.2 | 7.7 | 2.0 | 6.8 | 2.2 | 6.3 |
| % Reduction in 90° C. to 105° C. fraction compared to either Product 1A or 1B | % | | | 38 | 12 | 31 | 18 |
| $CDBI_{50}$ | wt % | 82.8 | 78.4 | 86.6 | 82.1 | 86.1 | 82.4 |
| % Increase in $CBDI_{50}$ compared to either Product 1A or 1B | % | | | 4.6 | 4.7 | 4.0 | 5.1 |
| Elution temperature | ° C. | 95.0 | 95.4 | 93.5 | 93.6 | 94.1 | 95.1 |
| Polymer Properties for 90-105° C. CTREF Fraction | | | | | | | |
| SCB/1000C | number | 3.4 | 3.0 | | 3.5 | | 3.0 |
| $M_n$ | | 110306 | 139118 | | 137893 | | 151106 |
| $M_w$ | | 224038 | 274674 | | 243365 | | 261311 |
| $M_z$ | | 390537 | 482660 | | 398845 | | 413780 |
| $M_w/M_n$ | | 2.03 | 1.97 | | 1.76 | | 1.73 |

Figure 1:
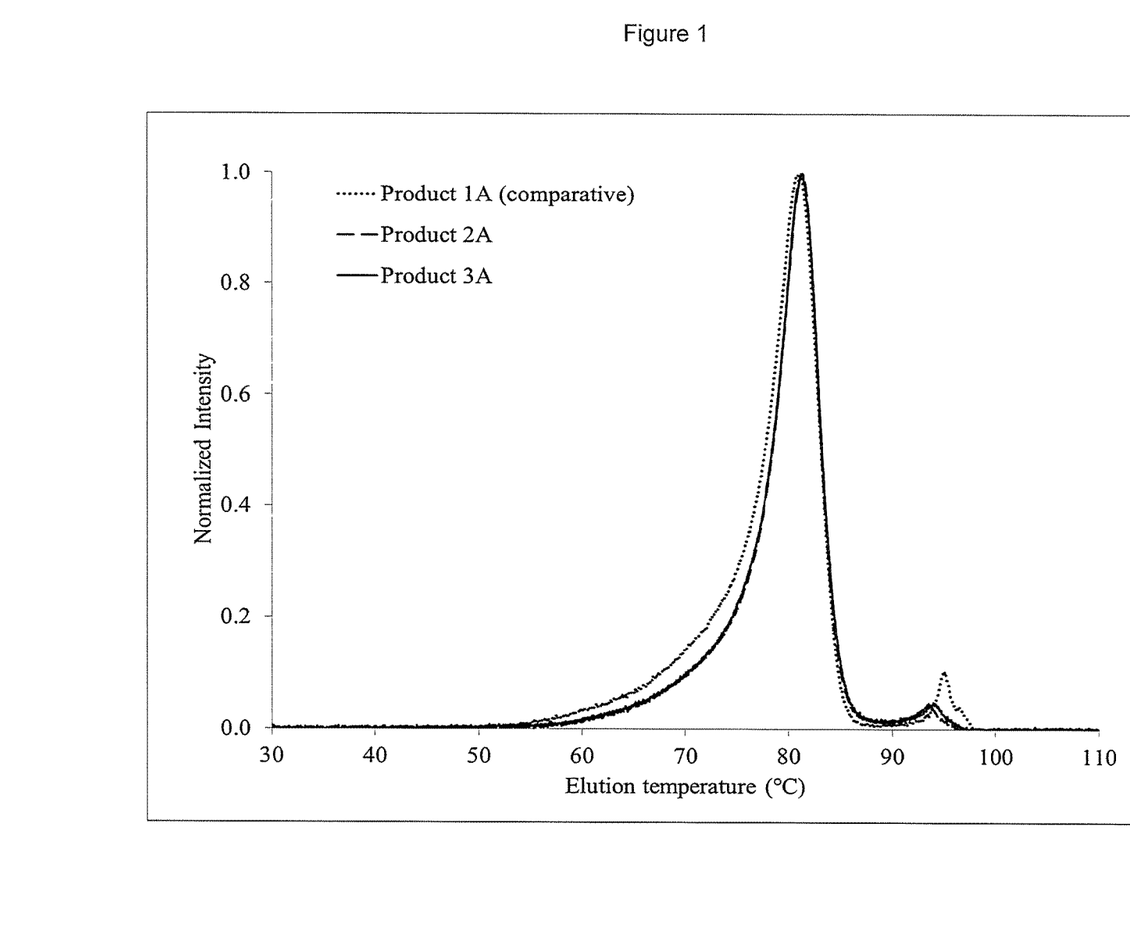
FIG. 1 is TREF profiles for Products 1A, 2A, and 3A.
Figure 2:
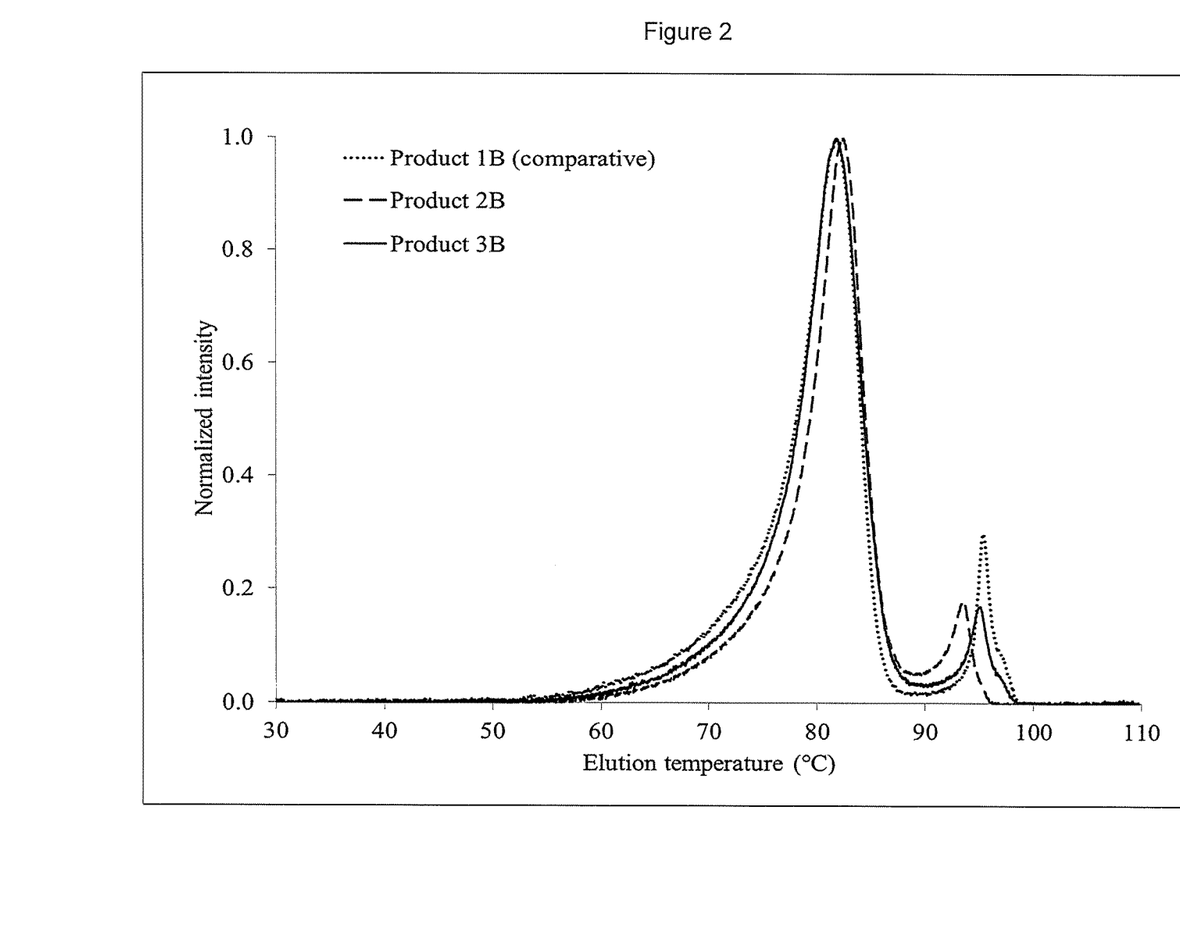
FIG. 2 is TREF profiles for Products 1B, 2B, and 3B.

Comparing copolymer products produced at the same agitator speed (e.g., comparing Products 2A and 3A to Product 1A, and comparing Products 2B and 3B to Product 3B) shows that the catalyst composition impacts the amount of polymer eluted at 90 to 105° C. in the TREF analysis.

TABLE 3

The results for the analysis for products 4A, 4B, 5A, 5B, 6A and 6B

| Product Designation | | Product 4A Comp. | Product 4B Comp. | Product 5A | Product 5B | Product 6A | Product 6B |
|---|---|---|---|---|---|---|---|
| CSTR agitator speed | rpm | 1170.0 | 406.6 | 1170.0 | 400.0 | 1170.0 | 400.0 |
| Catalyst Conditions | | | | | | | |
| Catalyst concentration in CSTR | ppm Ti | 0.46 | 0.40 | 0.67 | 0.72 | 1.18 | 1.07 |
| Al/Ti ratio | mol/mol | 100.0 | 100.0 | 100.0 | 100.0 | 100.0 | 100.0 |
| BHEB/Al ratio | mol/mol | 0.30 | 0.30 | 0.30 | 0.30 | 0.30 | 0.30 |
| Trityl borate/Ti ratio | mol/mol | 1.30 | 1.30 | 0.15 | 0.15 | — | — |
| Borane/Ti ratio | mol/mol | — | — | 1.05 | 1.05 | 1.20 | 1.20 |
| Polymer Properties | | | | | | | |
| Density | g/cc | 0.9192 | 0.9184 | 0.9183 | 0.9187 | 0.9181 | 0.9182 |
| MI (I2) | g/10 min | 8.58 | 3.18 | 7.16 | 3.40 | 5.18 | 3.02 |
| S. Ex. (I5/I2) | | 1.16 | 1.26 | 1.15 | 1.23 | 1.14 | 1.18 |
| MFR (I21/I2) | | 17.5 | 21.5 | 16.7 | 20.0 | 16.5 | 17.9 |
| $M_n$ | | 31322 | 41140 | 39634 | 36367 | 33963 | 38116 |
| $M_w$ | | 59621 | 80864 | 66251 | 75341 | 68775 | 77023 |
| $M_z$ | | 127211 | 211343 | 127785 | 178707 | 131624 | 164903 |
| $M_w/M_n$ | | 1.9 | 2.0 | 1.7 | 2.1 | 2.0 | 2.0 |
| TREF 90-105° C. fraction | wt % | 3.4 | 8.6 | 2.2 | 7.9 | 2.3 | 6.5 |
| % Reduction in 90° C. to 105° C. fraction compared to either Product 4A or 4B | % | | | 35 | 8 | 32 | 24 |
| $CDBI_{50}$ | wt % | 82.9 | 77.6 | 84.8 | 80.4 | 86.1 | 81.3 |
| % increase in $CBDI_{50}$ compared to either Product 4A or 4B | | | | 3.2 | 3.6 | 3.9 | 4.8 |
| Elution temperature | ° C. | 94.9 | 95.7 | 94.8 | 95.7 | 94.3 | 94.7 |

Figure 3:
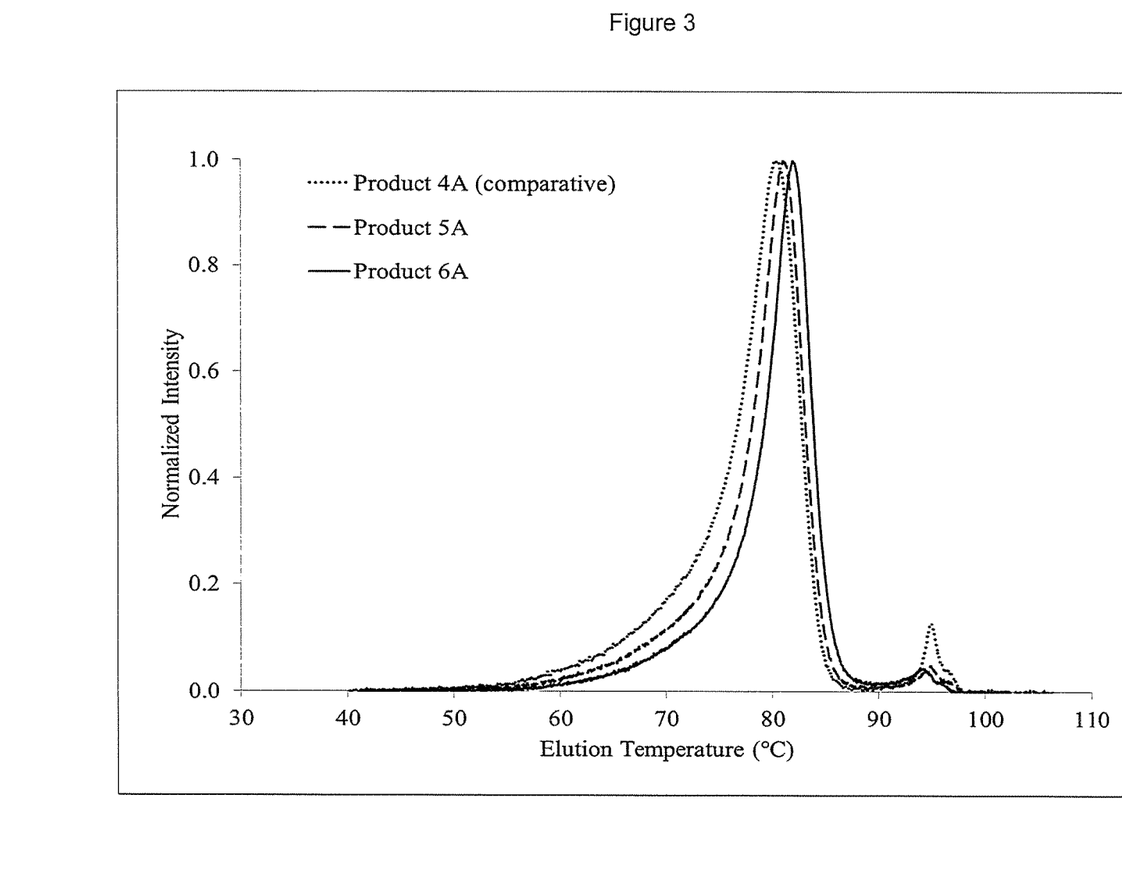
FIG. 3 is TREF profiles for Products 4A, 5A, and 6A.
Figure 4:
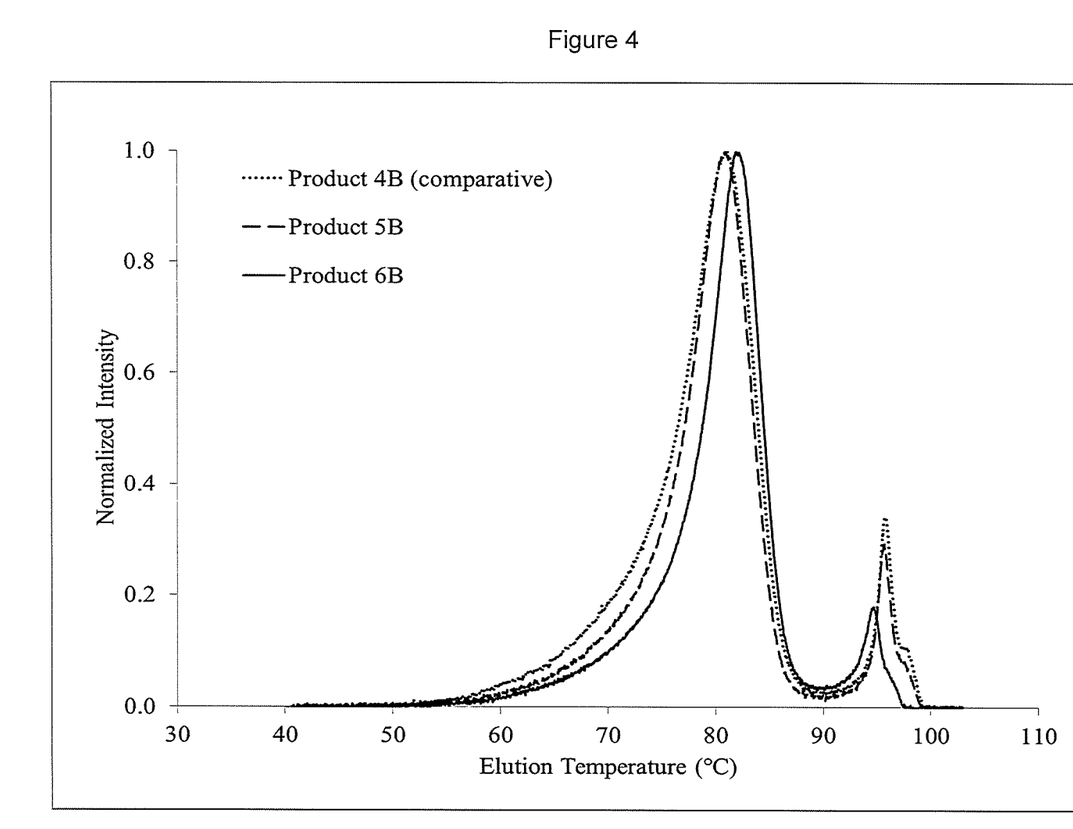
FIG. 4 is TREF profiles for Products 4B, 5B, and 6B.
Figure 5:
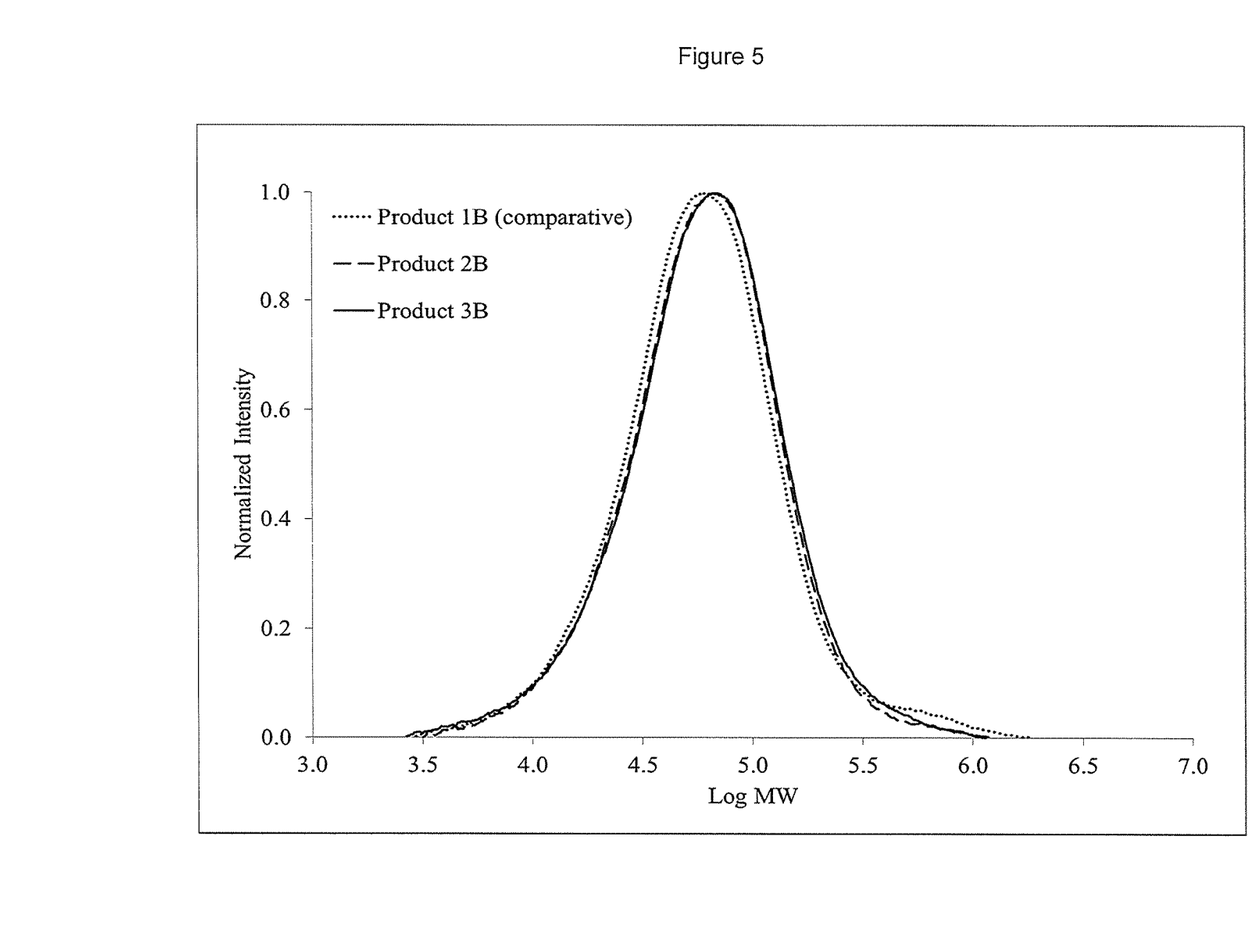
FIG. 5 is GPC profiles for Products 1B, 2B, and 3B.
Figure 6:
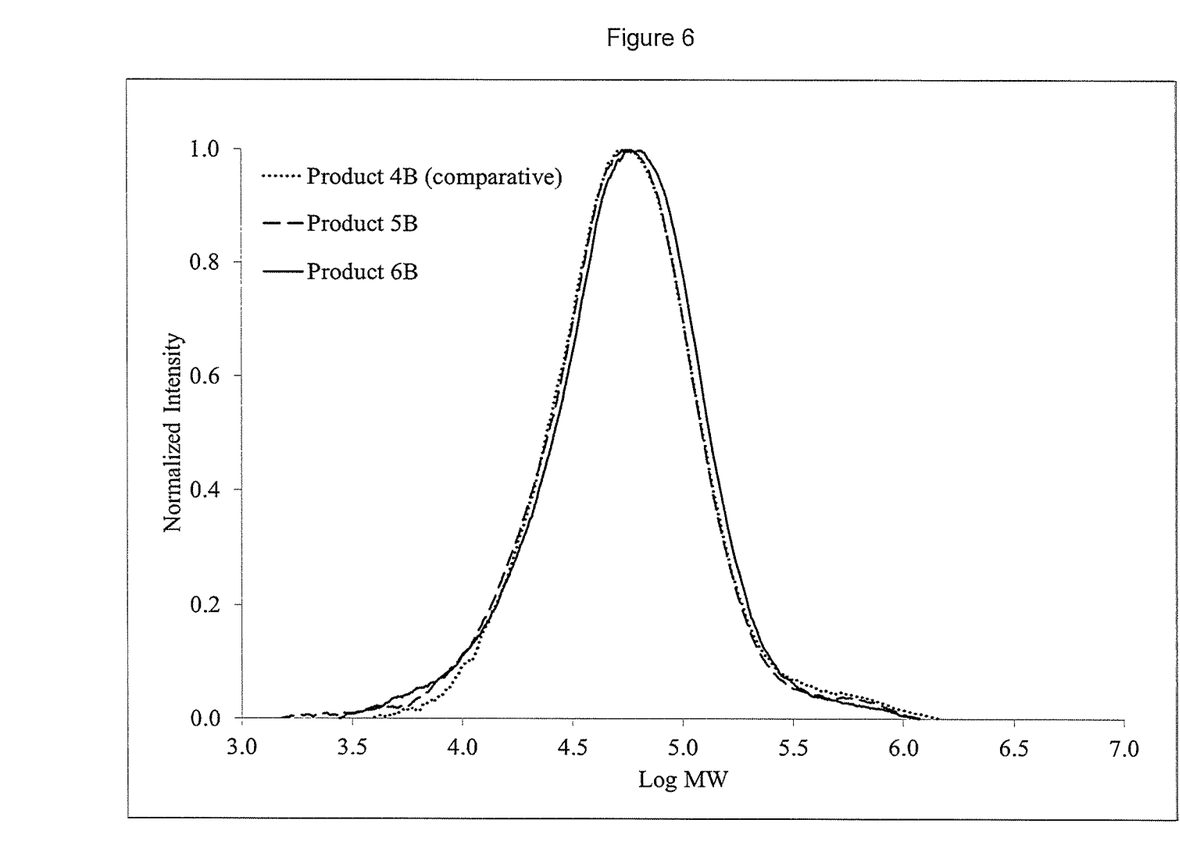
FIG. 6 is GPC profiles for Products 4B, 5B, and 6B.
Figure 7:
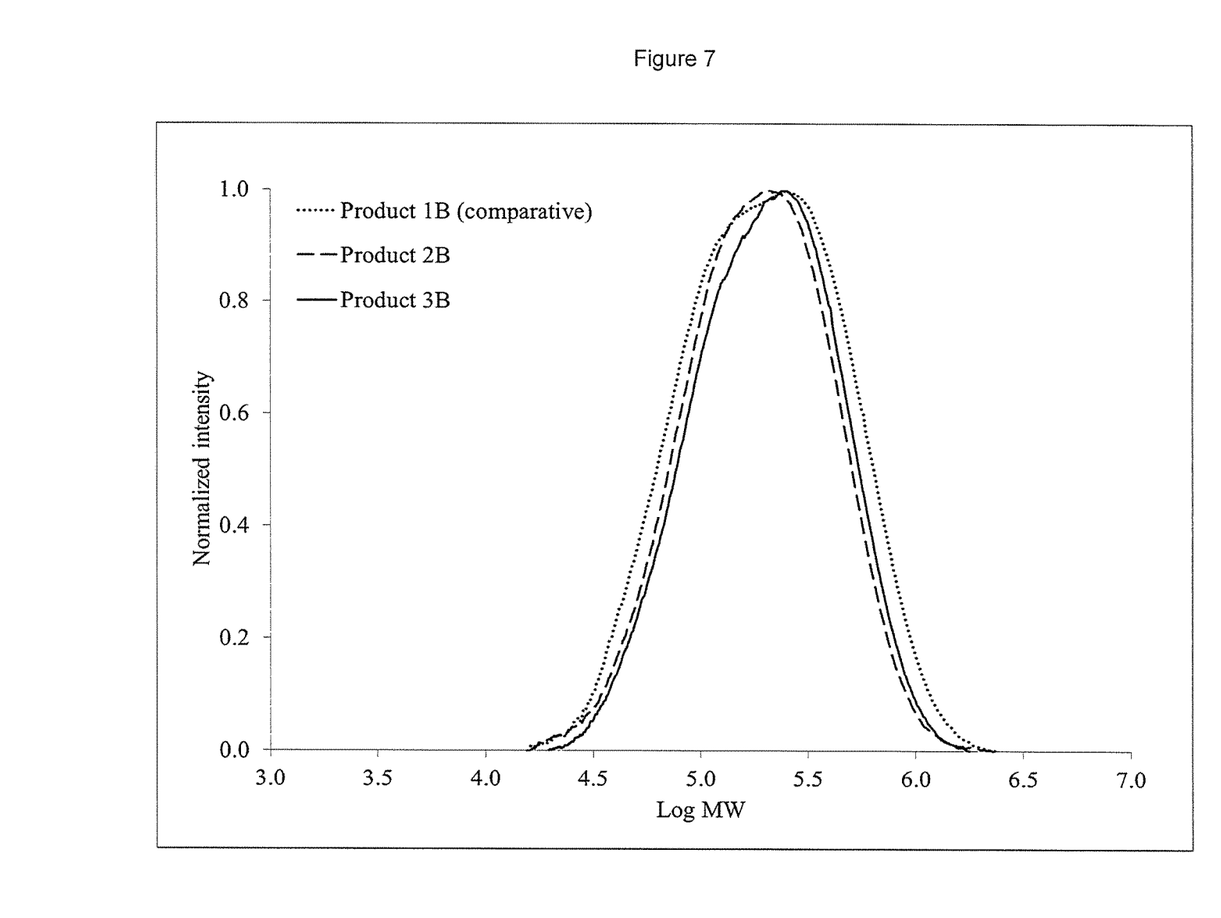
FIG. 7 is GPC profiles of high density fractions from PREP-TREF separation.

Again, by comparing copolymers produced at the same agitator speed, one can see that the type of ionic activator affects the amount of polymer eluting at a temperature from 90 to 105° C. in the TREF analysis.

What is claimed is:

1. A method to increase the homogeneity of an ethylene copolymer comprising one or more comonomers chosen from propylene, 1-butene, 1-hexene, and 1-octene by reducing the amount of the component eluting at a temperature of greater than 90° C. in the temperature rising elution fraction analysis wherein the copolymer is produced using a solution polymerization process at pressures from 6,000 kPa to 22,000 kPa, comprising two or more reactors in series in which the first reactor is operated at temperatures from 120° C. to 180° C. and the second and subsequent optional reactors are operated at higher temperatures up to 220° C. in the presence of a catalyst system comprising:

(I) transition metal catalyst of the formula:

wherein M is a transition metal, for example a transition metal chosen from Ti, Hf and Zr; L is a monoanionic ligand chosen from a cyclopentadienyl ligand, an indenyl ligand and a fluorenyl ligand which ligands are unsubstituted or up to fully substituted with one or more substituents chosen from chlorine atoms, fluorine atoms and $C_{1-4}$ alkyl radicals which are optionally substituted with chlorine or fluorine atoms,
and
a phosphinimine ligand of the formula:

wherein each $R^3$ is independently chosen from a hydrogen atom; a halogen atom; $C_{1-10}$ hydrocarbyl radicals which are optionally substituted by a halogen atom; a $C_{1-8}$ alkoxy radical; a $C_{6-10}$ aryl or aryloxy radical; and an amido radical which is optionally substituted by up to two $C_{1-10}$ hydrocarbyl radicals;
X is a monoanionic ligand chosen from $C_{1-4}$ alkyl radicals and a chlorine atom;
n is an integer from 1 to 3, and
p is an integer from 1 to 3, provided that the sum of n+p equals the valence state of M, and
further provided that two L ligands are optionally bridged by a silyl radical or a $C_{1-4}$ alkyl radical;

(II) a boron activator capable of ionizing the transition metal complex chosen from:
  (i) compounds of the formula $[R^5]^+[B(R^7)_4]^-$ wherein B is a boron atom, $R^5$ is a cyclic $C_{5-7}$ aromatic cation or a triphenylcarbenium cation and each $R^7$ is independently chosen from phenyl radicals which are unsubstituted or substituted with from 3 to 5 substituents chosen from a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently chosen from a hydrogen atom and a $C_{1-4}$ alkyl radical;
  (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is chosen from $C_{1-8}$ alkyl radicals, a phenyl radical which is unsubstituted or substituted by up to three $C_{1-4}$ alkyl radicals, or one $R^8$ taken together with the nitrogen atom to optionally form an anilinium radical and $R^7$ is as defined above; and
  (iii) compounds of the formula $B(R^7)_3$ wherein $R^7$ is as defined above;
(III) an aluminoxane of the formula $(R^4)_2AlO(R^4AlO)_mAl(R^4)_2$ wherein each $R^4$ is independently chosen from $C_{1-4}$ alkyl radicals, m is from 3 to 50;

and adjusting one or more of:
  a) the ratio of components 2 and 3; or
  b) changing component 2.

2. The method according to claim 1, wherein in the catalyst n is 2.

3. The method according to claim 2, where in one L is a phosphinimine ligand.

4. The process according to claim 3, wherein the starting ratio of catalyst components aluminoxane:catalyst:ionic activator is 100:1:greater than 1.1 and is reduced to 50-100:1:0.3-1.05.

5. The process according to claim 4, where in the ionic activator is chosen from triphenylcarbenium tetrakis(pentafluorophenyl)borate and tris(pentafluorophenyl)borane.

6. The method according to claim 5, wherein the aluminoxane is methyl aluminoxane which is optionally used in conjunction with a hindered phenol to provide a molar ratio of hindered phenol:Al up to 0.6:1.

7. The method according to claim 6, wherein the catalyst is cyclopentadienyl tri-tert-butylphosphinimine titanium dichloride.

8. The method according to claim 7, wherein the catalyst is alkylated within ten minutes prior to use.

\* \* \* \* \*